US009251200B2

(12) United States Patent
Raviola et al.

(10) Patent No.: US 9,251,200 B2
(45) Date of Patent: Feb. 2, 2016

(54) METHOD AND SYSTEM FOR EXECUTING DATABASE INSERT CALLS IN A MES SYSTEM

(71) Applicant: SIEMENS AKTIENGESELLSCHAFT, Munich (DE)

(72) Inventors: Alessandro Raviola, Genoa (IT); Elena Reggio, Genoa (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 434 days.

(21) Appl. No.: 13/721,382

(22) Filed: Dec. 20, 2012

(65) Prior Publication Data

US 2013/0166612 A1    Jun. 27, 2013

(30) Foreign Application Priority Data

Dec. 21, 2011   (EP) ..................................... 11194772

(51) Int. Cl.
*G06F 17/30*    (2006.01)

(52) U.S. Cl.
CPC ...... *G06F 17/3038* (2013.01); *G06F 17/30091* (2013.01); *G06F 17/30917* (2013.01)

(58) Field of Classification Search
CPC .......... G06F 17/3038; G06F 17/30091; G06F 17/30917
See application file for complete search history.

(56) References Cited

U.S. PATENT DOCUMENTS

| | | | |
|---|---|---|---|
| 6,732,095 B1 | 5/2004 | Warshavsky et al. | |
| 2002/0169788 A1* | 11/2002 | Lee et al. | 707/104.1 |
| 2003/0070144 A1* | 4/2003 | Schnelle | G06F 17/30917 715/239 |
| 2003/0101194 A1 | 5/2003 | Rys et al. | |
| 2003/0182268 A1* | 9/2003 | Lal | G06F 17/30917 |
| 2004/0220927 A1* | 11/2004 | Murthy et al. | 707/4 |
| 2005/0060647 A1* | 3/2005 | Doan et al. | 715/514 |
| 2006/0041502 A1* | 2/2006 | Blair | G06F 17/227 705/37 |
| 2006/0173865 A1* | 8/2006 | Fong | 707/100 |

(Continued)

FOREIGN PATENT DOCUMENTS

EP    2315138 A1    4/2011

OTHER PUBLICATIONS

"Manufacturing Execution Systems," by Meyer et al. McGraw-Hill (2009). Redacted Version provided. Full version available at: Safari Books Online.*

(Continued)

*Primary Examiner* — Daniel Kinsaul
(74) *Attorney, Agent, or Firm* — Laurence Greenberg; Werner Stemer; Ralph Locher

(57) ABSTRACT

A method and a system execute database insert calls in a MES system. The data to be stored into the database are represented in XML tree formats according to the S95 hierarchy model. The method includes: a) receiving as input a given XML tree corresponding to a given S95 hierarchy data to stored into the database; b) processing the given XML tree in order to generate a corresponding parallel structure; c) getting a given S95 entity type and its given set of node references from the given parallel structure; d) if the given set of node references is not empty, composing a database insert call passing the information of the given set of node references; e) if the given set of node references is not empty, executing the composed database insert call; and executing items c) to e) for all the S95 entity types of the given parallel structure.

4 Claims, 5 Drawing Sheets

(56) References Cited

U.S. PATENT DOCUMENTS

| | | | |
|---|---|---|---|
| 2007/0043743 A1* | 2/2007 | Chen et al. | 707/100 |
| 2008/0222087 A1* | 9/2008 | Balmin et al. | 707/2 |
| 2008/0243904 A1* | 10/2008 | Fan | 707/102 |
| 2009/0069921 A1* | 3/2009 | Balzer et al. | 700/97 |
| 2010/0131520 A1* | 5/2010 | Weinberg et al. | 707/756 |
| 2011/0077761 A1 | 3/2011 | Copello et al. | |

OTHER PUBLICATIONS

Rys, "Bringing the Internet to Your Database: Using SQL Server 2000 and XML to Build Loosely-Coupled Systems"; Microsoft Corporation 2001; pp. 465-472; http://www.microsoft.com/sql.

* cited by examiner

METHOD AND SYSTEM FOR EXECUTING DATABASE INSERT CALLS IN A MES SYSTEM

CROSS-REFERENCE TO RELATED APPLICATION

This application claims the priority, under 35 U.S.C. §119, of European application EP 11 194 772, filed Dec. 21, 2011; the prior application is herewith incorporated by reference in its entirety.

BACKGROUND OF THE INVENTION

Field of the Invention

The present invention relates to a method and to a system for customizing a graphic user interface (GUI) of a manufacturing execution system (MES) screen.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated IT infrastructure that helps them in coordinating production on a global scale and, if necessary, in real time. The manufacturing execution system (MES) is generally known as the information technology (IT) layer that integrates the business systems (e.g. ERP) and production control systems.

The Siemens Corp. offers a broad range of MES products, under its SIMATIC® product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred as ISA-95 or S95.

The functions that a MES system usually includes are resource allocation and status, dispatching production orders, data collection/acquisition, quality management, maintenance management, performance analysis, operations/detail scheduling, document control, labor management, process management and product tracking.

Thus, the goal of MES systems developed by software suppliers is to provide manufacturing companies (the customers) with tools for measuring and controlling production activities with the aim of boosting profitability, increasing productivity, improving quality and process performance in manufacturing plants.

Production environments are usually managed by heterogeneous hardware and software systems.

FIG. 1 is taken from FIG. 3 of the ISA S95 Standard [Ref. 1] and depicts the different levels of a functional hierarchy model associated with manufacturing control systems and other business systems: business planning and logistics, manufacturing operations and control, and batch, continuous, or discrete control. This functional hierarchy model defines hierarchical levels at which decisions are made.

Flow data are moved between top level managers, clerks, line operators and even programmable logic controllers (PLCs). The MES is the part of the system working as a middle layer—Level 3—and it is typically managing the plant through PLCs.

Having such kind of heterogeneous systems mean to have a different set of software and hardware parts that have to communicate among them.

In some manufacturing scenarios, especially the one related to discrete manufacturing like automotive or aerospace industries, the of flow data to be shared between the different layers and inside the same layer is so large that the involved systems are required to have high performances.

In such scenarios, the production requests introduced into the Level 4 system can be of a high amount on a daily basis and, thus, the Level 3 system has the demanding task to efficiently transform and manage the production requests into final products.

Moreover, the data collected by a MES system should be kept aligned with the Level 4 application, i.e. the provider of the data, and daily alignment have typically to be performed between the MES system and the others external systems, e.g. Level 4 or even others Level 3 applications.

Systems for managing manufacturing plants usually make use of relational databases for storing information and are based on data migrations between ERP systems and MES systems.

A very critical issue is the amount of time needed by the MES system to import and manage the alignment of the data into its databases; this is due to the fact that the volume of data to be imported can be often very large.

At present, most common database engines do provide high performance import/export tools but such kind of tools usually work with input files which are in comma separated value (CSV) formats having high data redundancy.

It is noted that the use of such CSV formats is not always recommended in the MES environment.

In fact, for example, or the interactions among the various levels of the S95 models, data are commonly exchanged in a hierarchal format, which avoid data redundancy due to the hierarchical format itself. Thus, database import/export tools working with a CSV format and similar formats cannot be used in such situations.

An example of a typical S95 hierarchy is shown in FIG. 2.

FIG. 2 is taken from FIG. 22 of the ISA S95 Standard [Ref. 1] and depicts the production schedule model. As explained in paragraphs 7.5.1 and 7.5.2 of the ISA S95 Standard [Ref. 1], a production schedule is made up of one or more production requests; a production request defines a request for production for a single product identified by a production rule; and a production request contains the information required by manufacturing to fulfill scheduled production.

In FIG. 2 are depicted the MES entities of the ISA S95 Standard [Ref. 1], hereinafter referred as S95 entities, such as for example each specific production request, each specific segment requirement, each specific production schedules, each specific personnel requirement and so on.

With the term S95 entity type it is intended the generalization of the concept of S95 entity as for example there is the production request type, the segment requirement type and so on.

Hence, as explained above, in the MES environment, other database import/export tools need to be used. Typically, such tools simply process data and the insertion of data into the MES databases is performed on a "step-by-step" basis.

For example, Business To Manufacturing Markup Language (B2MML) B2MML is the standard typically used to represent the S95 hierarchy.

B2MML is an XML implementation of the S95 family of standards, consisting of a set of XML schemas written using the World Wide Web Consortium's XML Schema language that implement the data models in the S95 standard.

Unfortunately, the above mentioned state of the art MES database import/export tools suffer of poor performances in terms of required processing time.

It is noted that one of the main drawbacks of a "step-by-step" processing is related to the useless round trips performed among different tiers.

In fact, in three tiers architecture, usually there is a client—e.g. the user application—which tell to a server—e.g. the main server in the MES system for the managing of Production Schedule S95 hierarchy—to store the S95 data hierarchy in a database where data are made persistent and usable for further operations during production steps.

In three-tier and also two-tier architectures, the server, processing step by step the S95 hierarchy, performs basic operation on the database (Add, Update, Delete). For example a server importing a production schedule with one thousand production requests will activate one thousand calls towards the database in order to store the new production request.

From a performance perspective, the activation of one call transferring all the data to the database would be more desirable than the present scenario of transferring of the same quantity of data but with one thousand calls.

Moreover, it is noted that each production request is typically composed by a lot of information (Segment Requirement, Material, Personnel, Equipment, etc. . . . ) according to the S95 hierarchy model. Hence, the server has to perform for each of this sub-part a specific call toward the database in order to store it. Of course this happens when, as usual, each sub-part (or may be called entity) of the S95 hierarchy is modeled by a specific table or a set of tables.

Let us analyze a simplified example of a S95 hierarchy as shown in FIG. 3 and in Table 1 below. FIG. 3 is a block diagram depicting the simplified example of a S95 hierarchy as shown in the XML form representation given in Table 1 below.

TABLE 1

| | |
|---|---|
| <ProductionSchedule> | |
| a) | <ID>Default</ID> |
| b) | <ProductionRequest> |
| i) | <ID>Order_Car1</ID> |
| ii) | <SegmentRequirement> |
| (1) | <ID>Engine Assembly</ID> |
| (2) | <Resources>......</Resources> |
| iii) | </SegmentRequirement> |
| iv) | <SegmentRequirement> |
| (1) | <ID>Brake and clutch assembly</ID> |
| (2) | <Resources>......</Resources> |
| v) | </SegmentRequirement> |
| vi) | <SegmentRequirement> |
| (1) | <ID>Tire assembly</ID> |
| (2) | <Resources>......</Resources> |
| vii) | </SegmentRequirement> |
| viii) | <SegmentRequirement> |
| (1) | <ID>Bolt assembly</ID> |
| (2) | <Resources>......</Resources> |
| ix) | </SegmentRequirement> |
| x) | ...... |
| c) | </ProductionRequest> |
| d) | <ProductionRequest> |
| i) | <ID>Order_Car2</ID> |
| ii) | <SegmentRequirement> |

TABLE 1-continued

| | |
|---|---|
| (1) | <ID>Engine Assembly</ID> |
| (2) | <Resources>......</Resources> |
| iii) | </SegmentRequirement> |
| iv) | <SegmentRequirement> |
| (1) | <ID>Brake and clutch assembly</ID> |
| (2) | <Resources>......</Resources> |
| v) | </SegmentRequirement> |
| vi) | <SegmentRequirement> |
| (1) | <ID>Tire assembly</ID> |
| (2) | <Resources>......</Resources> |
| vii) | </SegmentRequirement> |
| viii) | <SegmentRequirement> |
| (1) | <ID>Bolt assembly</ID> |
| (2) | <Resources>......</Resources> |
| ix) | </SegmentRequirement> |
| x) | ...... |
| e) | </ProductionRequest> |
| </ProductionSchedule> | |

When the hierarchical structure is processed according to known "step-by-step" techniques, it means that the server performs the required action on the database starting from the top of the hierarchical structure (i.e. production schedule "Default") for each single entity or node on a step by step basis. For example, when the hierarchy is in the XML form as the one shown in Table 1, starting from the Production Schedule XML node "Default", the server will perform its action on each S95 entity by processing the first Production Request node "Order_Car1" and its children, e.g. the Segment Requirement nodes "Engine Assembly", "Brake and clutch assembly", "Tire Assembly", "Bolt Assembly", then the second Production Request and so on, until it arrives to the last Production Request "Order_Car2" and each leaf of them, e.g. Segment Requirement "Engine Assembly", "Brake and clutch assembly", "Tire Assembly", "Bolt Assembly".

Hence, whenever a MES system has to load a given S95 structure into a database, the server needs to perform as many insert calls towards the database as the number of the objects present in the given ISA95 structure. Unfortunately, in scenarios where thousands of entities/objects are present, such step-by-step procedures have the drawback of leading to thousands of database calls. Thus, such procedures have the disadvantage of suffering of poor performances in terms of required processing time.

SUMMARY OF THE INVENTION

It is accordingly an object of the invention to provide a method and a system for executing database insert calls in a MES that overcome the above-mentioned disadvantages of the prior art methods and devices of this general type, which reduces the number of required insert database calls.

With the foregoing and other objects in view there is provided, in accordance with the invention a method for executing database insert calls in a MES system. Wherein data to be stored into a database are represented in XML tree formats according to a S95 hierarchy model in which each XML tree node is representing a specific S95 entity. The method includes:

a) receiving as an input a given XML tree corresponding to given S95 hierarchy data to be stored into the database;

b) processing the given XML tree for generating a corresponding parallel structure, the processing step including the following sub-steps:

b1) grouping all tree nodes according to their MES type into a set of entity types;

b2) storing, for each entity type, a set of references pointing to each tree node of an entity type;

b3) generating the parallel structure corresponding to the given XML tree by storing the set of entity types and corresponding sets of node references;

c) getting a given S95 entity type and the corresponding set of node references from the parallel structure;

d) if the corresponding set of node references is not empty, composing a database insert call passing information of the given set of node references;

e) if the corresponding set of node references is not empty, executing the database insert call of step d); and f) executing steps c) to e) for all the S95 entity types of the parallel structure.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

With invention embodiments, the number of import calls to the database is reduced to a minimum number of insert calls, with a single import call for each S95 entity type. In fact, it is noted that the ISA95 structure is composed by a finite number of object types".

In situations of massive data imports, embodiments of the present invention improve the performances by reducing the number of round trips.

Other features which are considered as characteristic for the invention are set forth in the appended claims.

Although the invention is illustrated and described herein as embodied in a method and a system for executing database insert calls in a MES system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

According to the present invention, in a MES system data is to be stored by execution of insert calls in a MES database. Such data to be stored are represented in XML tree formats according to the S95 hierarchy model in which each XML tree node is representing a specific S95 entity.

Figure 5:
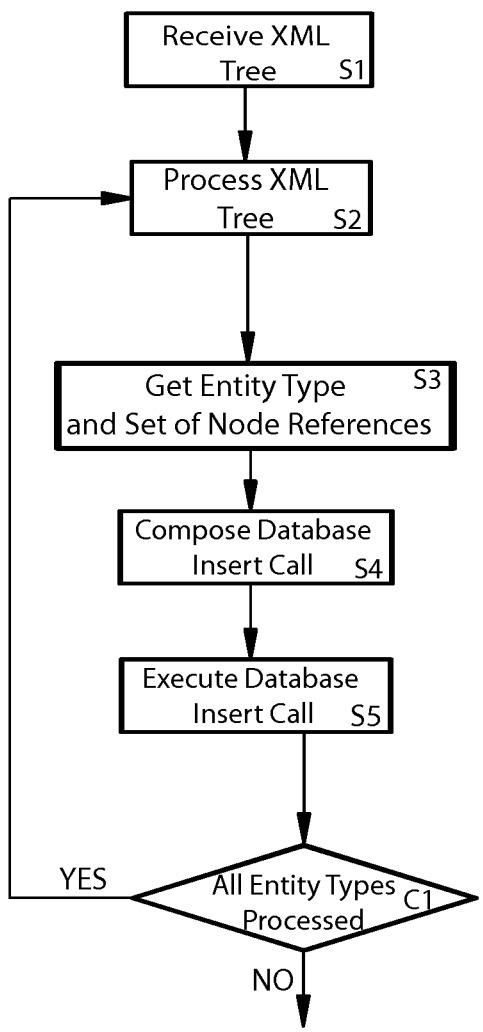
FIG. 5 is a flow chart schematically illustrating method steps according to the invention.

FIG. 5 is a flow chart schematically illustrating the method steps according to the present invention.

In step S1, a given XML tree corresponding to a given S95 hierarchy data to be stored into the database is received as input. Preferably the given XML tree is received as input by a server in a MES system.

In step S2, the given XML tree is processed in order to create a corresponding parallel structure.

The parallel structure is generated first, by grouping all the tree nodes according to their MES type into a set of entity types; then, by storing, for each entity type, a set of references pointing to each tree node of that type; then, by generating the parallel structure corresponding to the given XML tree by storing the set of entity types and their corresponding sets of node references.

Thus, step S2 is a pre-processing phase, performed by analyzing the input XML tree structure, to create the parallel structure by collecting together S95 entities having the same type and their node references.

The parallel structure created in such a way is a "helper construct", representing the XML tree in a different format, storing references to the XML nodes according to their type. As used herein, the term construct is to be intended in the programming language meaning, for example in the C++ language the construct can be a class or a structure.

At step S3, a given S95 entity type and its given set of node references is taken from the given parallel structure.

At step S4, if the given set of node references is not empty, a database insert call is composed passing the information of the given set of node references. With the terms "compose a call" it is intended the preparation of the objects and of the database call by accessing the information of the node references of the specific S95 entity type under processing, e.g. with the construction of a Microsoft ADO/ADO.NET object to be used to execute a stored procedure performing the database insert call.

At step S5, if the given set of node references is not empty, the database insert call composed at step S4 is executed.

According to the algorithm depicted in FIG. 5, steps S3, S4 and S5 are executed for all the S95 entity types of the given parallel structure by performing the conditional check C1 in which it is checked if there are other S95 entity types to be processed.

Figure 1:
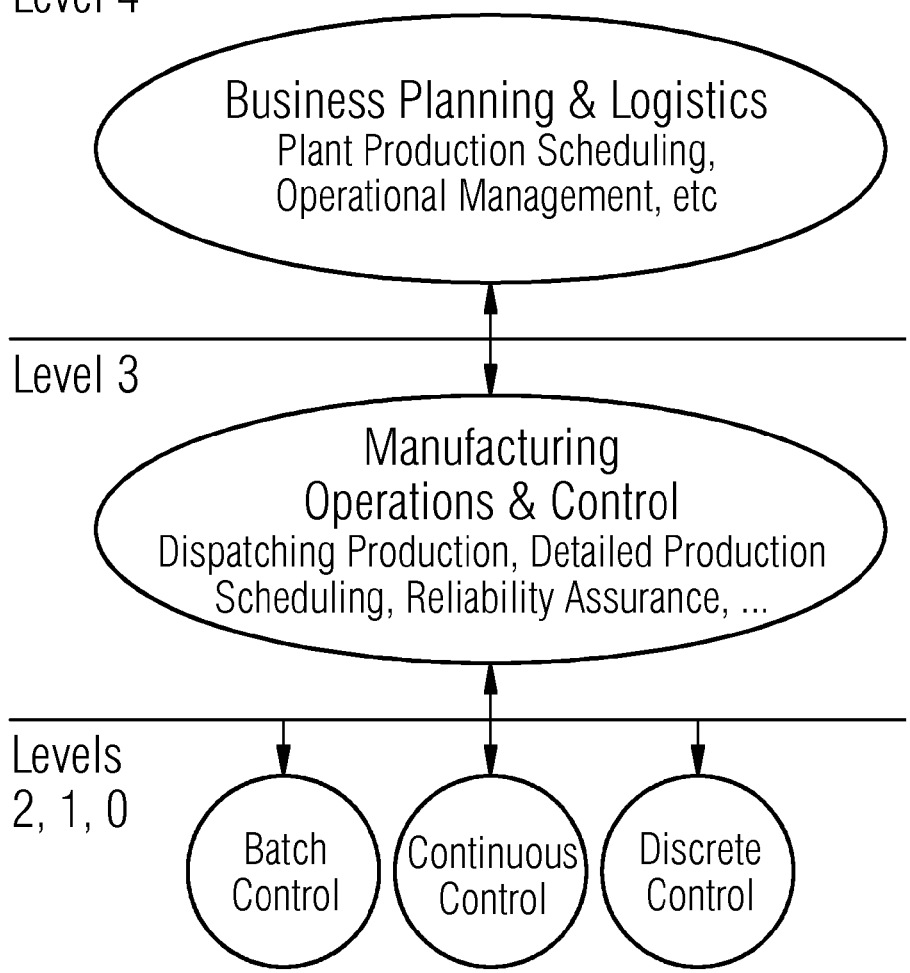
FIG. 1 is a block diagram depicting the S95 functional hierarchy model according to the prior art.
Figure 2:
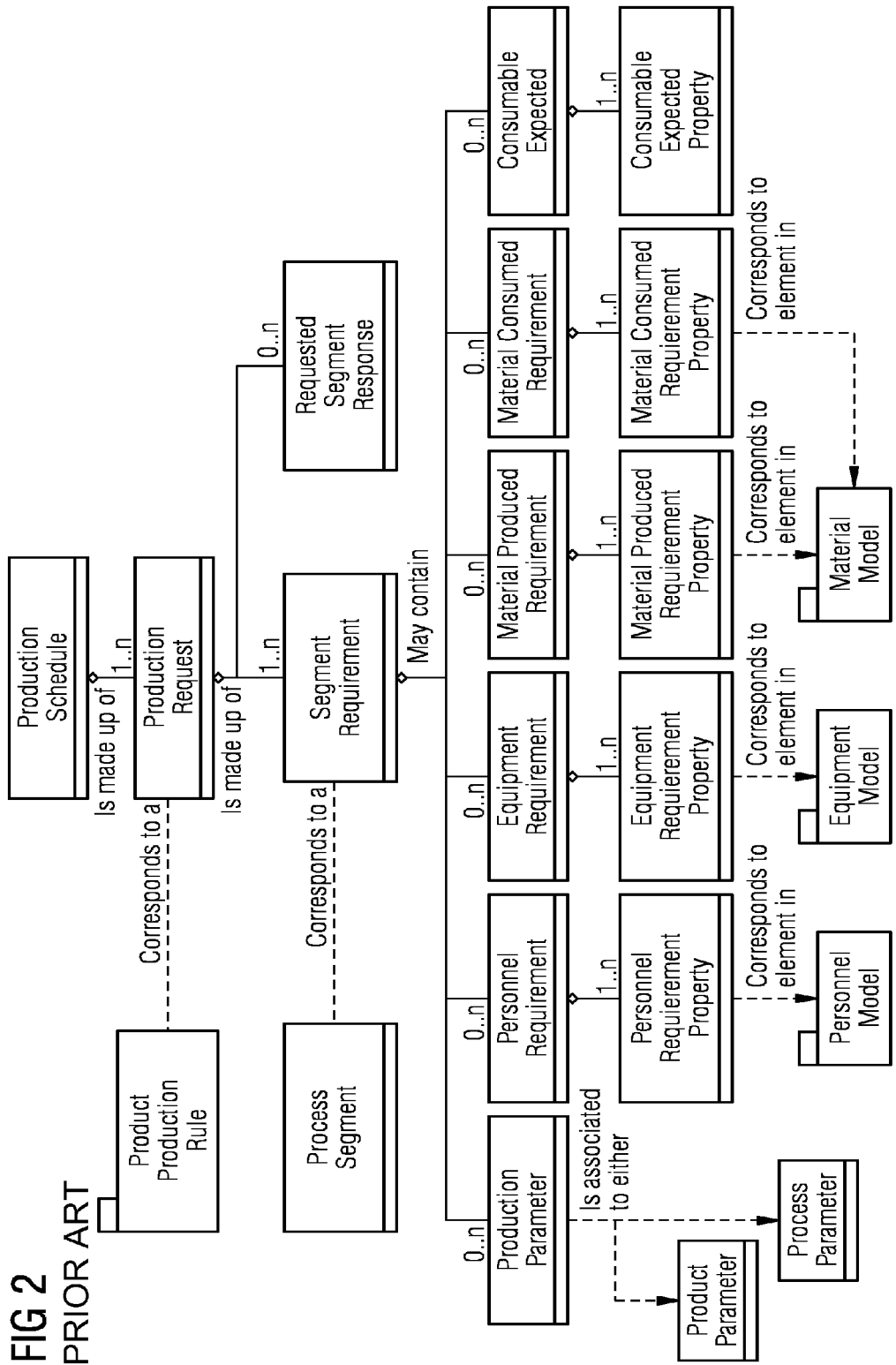
FIG. 2 is a block diagram depicting the S95 production schedule model according to the prior art.
Figure 3:
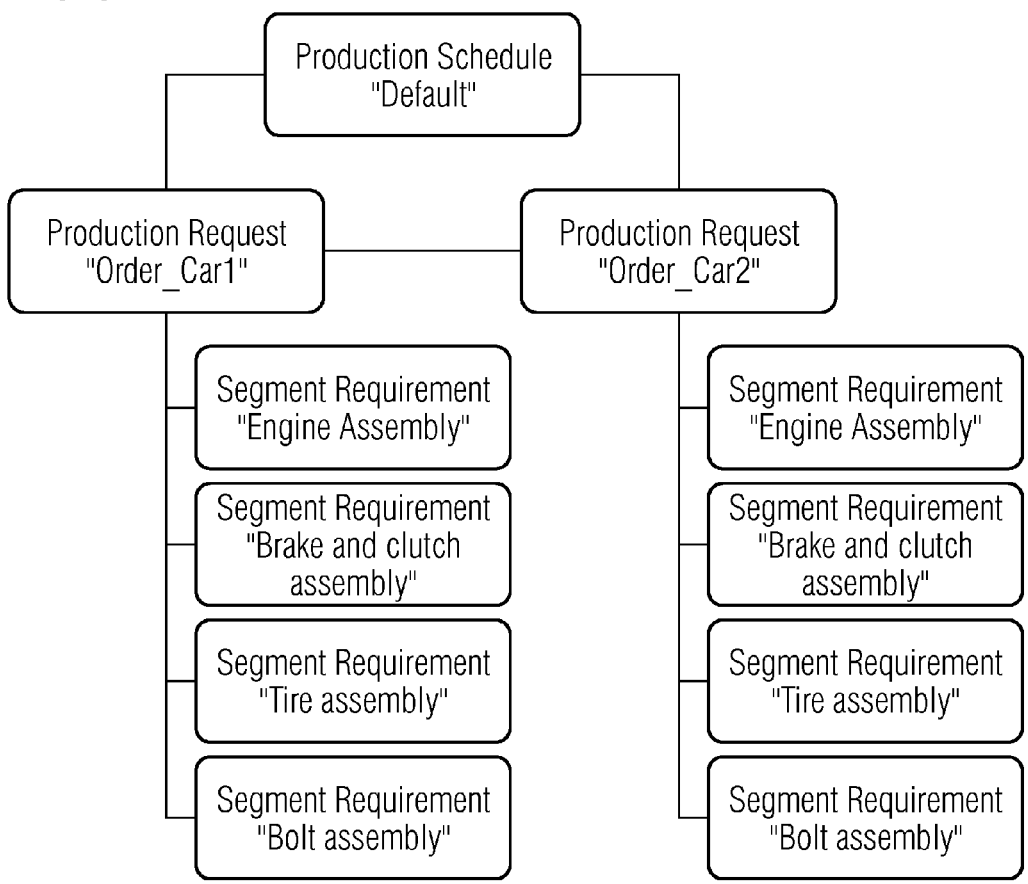
FIG. 3 is a block diagram depicting a simplified example of a S95 hierarchy according to the invention.
Figure 4:
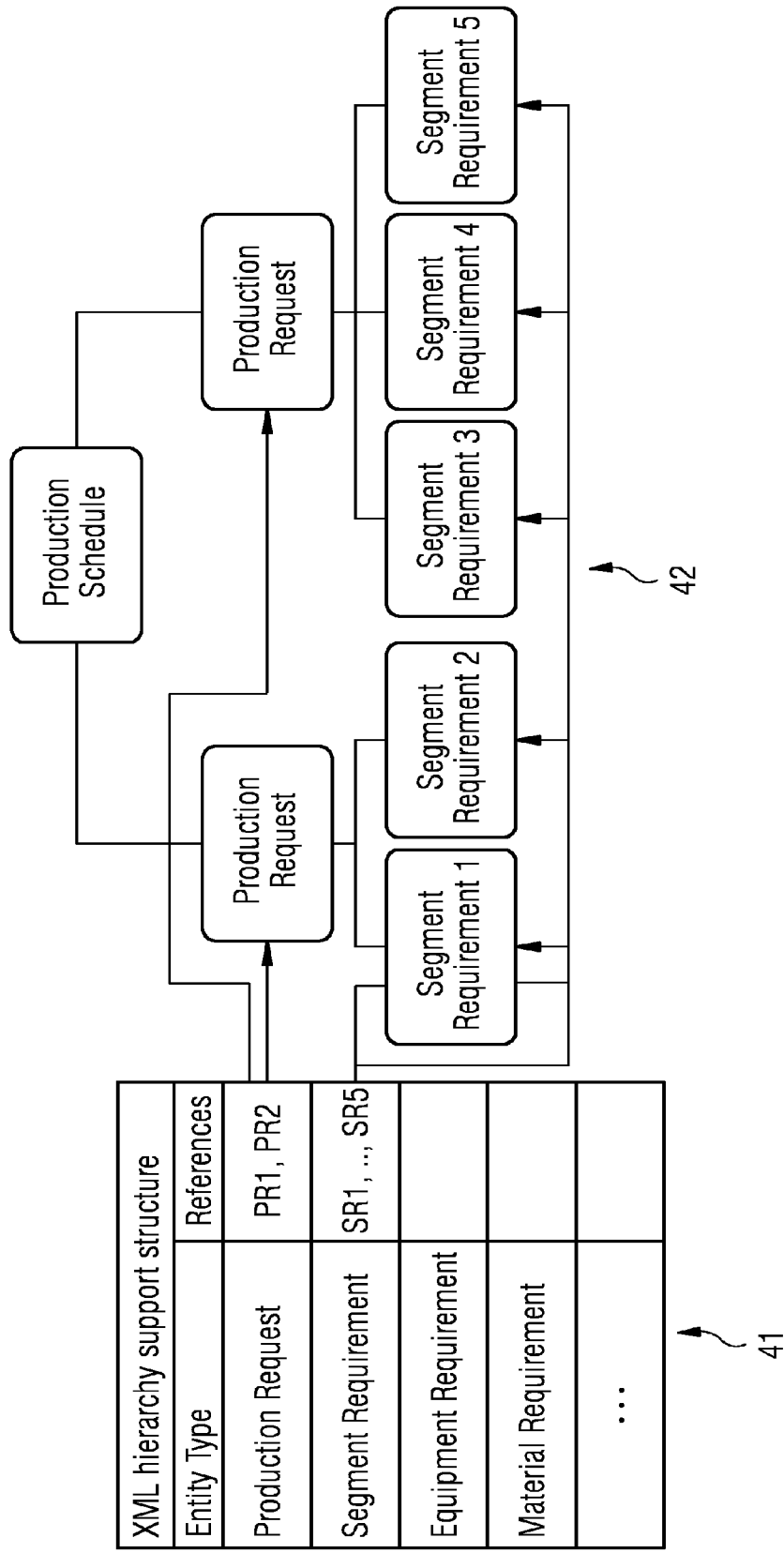
FIG. 4 is an illustration of a support structure on the left side associated to the S95 hierarchy diagram on the right side according to the invention.

FIG. 4 shows a parallel/support structure on the left side associated to the S95 hierarchy diagram on the right side according to an example embodiment of the present invention.

The XML form representation of the S95 hierarchy diagram of the right side of FIG. 4 is given in Table 2 below.

TABLE 2

| | |
|---|---|
| <ProductionSchedule> | |
| a) | <ID>Default</ID> |
| b) | <ProductionRequest> |
| i) | <ID>Order_Car1</ID> |
| ii) | <SegmentRequirement> |
| (1) | <ID>Segment Requirement 1</ID> |
| (2) | <Resources></Resources> |
| iii) | </SegmentRequirement> |
| iv) | <SegmentRequirement> |
| (1) | <ID>Segment Requirement 2</ID> |
| (2) | <Resources></Resources> |
| v) | </SegmentRequirement> |
| c) | </ProductionRequest> |
| d) | <ProductionRequest> |
| i) | <ID>Order_Car2</ID> |
| ii) | <SegmentRequirement> |
| (1) | <ID>Segment Requirement 3</ID> |
| (2) | <Resources></Resources> |
| iii) | </SegmentRequirement> |
| iv) | <SegmentRequirement> |

TABLE 2-continued

| | |
|---|---|
| (1) | <ID>Segment Requirement 4</ID> |
| (2) | <Resources></Resources> |
| v) | </SegmentRequirement> |
| vi) | <SegmentRequirement> |
| (1) | <ID>Segment Requirement 5</ID> |
| (2) | <Resources></Resources> |
| vii) | </SegmentRequirement> |
| e) | </ProductionRequest> |
| </ProductionSchedule> | |

In the left side of FIG. 4 it is shown the parallel structure 41 created by the MES server corresponding to the XML tree 42, as also shown in the XML form representation of Table 2, according to this example embodiment.

Once the parallel structure 41 has been created, the MES server advantageously processes the parallel structure instead of the XML tree 42 as represented in the XML form of Table 2 to improve the performances in executing calls to the database.

In fact the server is enabled to perform a single call for each single type of S95 entities instead of performing a single insert call for each single S95 entity.

The MES server starts to process the first S95 entity type of the support structure, e.g. in this example Production Request type, it composes a single call to the database with the information of the node references PR1,PR2 pointing to the nodes Production Request 1 and Production Request 2 and it executes the composed insert calls.

Then, the MES server processes the second level of the support structure 41, e.g. in this example Segment Requirement type, it composes a single call to the database passing the information of the node references SR1, . . . , PR5 pointing to the nodes Segment Requirement 1 to Segment Requirement 5 and it executes the composed insert calls.

Then, the MES server stops the algorithm execution because others entity types of the support structure 41 have no more node references pointing to the nodes XML tree 42.

Thus, instead of having a "step-by-step" procedures, all the Production Request entities are processed together and the same thing is done for all the Segment Requirement entities in the XML tree 42.

In addition to the embodiments of the present invention described above, the person of average skill in the art will be able to arrive at a variety of other arrangements and steps which, if not explicitly described in this document, nevertheless fall within the scope of the appended claims.

LIST OF USED ACRONYMS

B2MML Business To Manufacturing Markup Language
CSV Comma Separated Values
ERP Enterprise Resource Planning
GUI Graphical User Interface
IT Information Technology
MES Manufacturing Execution System
PLC Programmable Logic Controller
XML eXtensible Markup Language

REFERENCES

[Ref. 1] Enterprise—Control System Integration
Part 1: Models and Terminology,
Draft 15, January 2000
ISA-ds95.00.01-2000

The invention claimed is:

1. A method for executing database insert calls in a MES system, wherein data to be stored into a database are represented in XML tree formats according to a S95 hierarchy model in which each XML tree node is representing a specific S95 entity, which method comprises the steps of:
   a) receiving as an input a given XML tree corresponding to given S95 hierarchy data to be stored into the database;
   b) processing the given XML tree for generating a corresponding parallel structure, the processing step including the following sub-steps:
      b1) grouping all tree nodes according to their MES type into a set of entity types;
      b2) storing, for each entity type, a set of references pointing to each tree node of an entity type;
      b3) generating the parallel structure corresponding to the given XML tree by storing the set of entity types and corresponding sets of node references;
   c) getting a given S95 entity type and the corresponding set of node references from the parallel structure;
   d) for the given S95 entity type, determining that the corresponding set of node references is not empty, composing a database insert call passing information of the given set of node references;
   e) for the given S95 entity type, determining that the corresponding set of node references is not empty, executing the database insert call of step d); and
   f) executing steps c) to e) for all the S95 entity types of the parallel structure.

2. The method according to claim 1, wherein the method is implemented in software.

3. A system, comprising:
   means for performing a method for executing database insert calls in a MES system, wherein data to be stored into a database are represented in XML tree formats according to a S95 hierarchy model in which each XML tree node is representing a specific S95 entity, said means programmed to:
   a) receive as an input a given XML tree corresponding to given S95 hierarchy data to be stored into the database;
   b) process the given XML tree for generating a corresponding parallel structure, the processing step including the following sub-steps:
      b1) group all tree nodes according to an MES type into a set of entity types;
      b2) store, for each entity type, a set of references pointing to each tree node of the entity type;
      b3) generate the parallel structure corresponding to the given XML tree by storing the set of entity types and corresponding sets of node references;
   c) get a given S95 entity type and the corresponding set of node references from the parallel structure;
   d) for the given S95 entity type, determining that the corresponding set of node references is not empty, compose a database insert call passing information of the corresponding set of node references;
   e) for the given S95 entity type, determining that the corresponding set of node references is not empty, execute the database insert call of step d); and
   f) execute steps c) to e) for all the S95 entity types of the parallel structure.

4. A non-transitory computer readable medium having computer-executable instructions for performing a method for executing database insert calls in a MES system, wherein data to be stored into a database are represented in XML tree formats according to a S95 hierarchy model in which each XML tree node is representing a specific S95 entity, which method comprises the steps of:

a) receiving as an input a given XML tree corresponding to given S95 hierarchy data to be stored into the database;
b) processing the given XML tree for generating a corresponding parallel structure, the processing step including the following sub-steps:
   b1) grouping all tree nodes according to an MES type into a set of entity types;
   b2) storing, for each entity type, a set of references pointing to each tree node of the entity type;
   b3) generating the parallel structure corresponding to the given XML tree by storing a set of entity types and corresponding sets of node references;
c) getting a given S95 entity type and the corresponding set of node references from the parallel structure;
d) for the given S95 entity type, determining that the corresponding set of node references is not empty, composing a database insert call passing information of the corresponding set of node references;
e) for the given S95 entity type, determining that the corresponding set of node references is not empty, executing (S5) the database insert call of step d); and
f) executing steps c) to e) for all the S95 entity types of the parallel structure.

* * * * *